(12) United States Patent  
Tomioka

(10) Patent No.: US 9,141,025 B1  
(45) Date of Patent: Sep. 22, 2015

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Hiroyuki Tomioka, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 14/690,848

(22) Filed: Apr. 20, 2015

(30) Foreign Application Priority Data

Apr. 22, 2014 (JP) .................................. 2014-088040

(51) Int. Cl.
G03G 15/043 (2006.01)
G02B 26/12 (2006.01)

(52) U.S. Cl.
CPC ............. *G03G 15/043* (2013.01); *G02B 26/121* (2013.01)

(58) Field of Classification Search
CPC ..... G02B 26/121; G03G 15/043; B41J 2/442; B41J 2/473
See application file for complete search history.

(56) References Cited

FOREIGN PATENT DOCUMENTS

| JP | 2006-171562 | | 6/2006 |
|----|----|----|----|
| JP | 2006171562 A | * | 6/2006 |
| JP | 2007-139932 | | 6/2007 |
| JP | 2007139932 A | * | 6/2007 |

* cited by examiner

*Primary Examiner* — Sarah Al Hashimi

(74) *Attorney, Agent, or Firm* — Wenderoth, Lind & Ponack, L.L.P.

(57) ABSTRACT

An optical scanning device includes a mirror adjusting mechanism which includes an abutting surface and a mirror holding member. The abutting surface is provided with one or more first support protrusions making point contact or line contact with a reflecting surface of a planar mirror on the same straight line. The mirror holding member includes a mirror receiving part provided with one second support protrusion making point contact with the reflecting surface of the planar mirror. The mirror holding member is rotated while maintaining a contact state between the planar mirror and the first support protrusions and a contact state between the mirror receiving part and the abutting surface, so that an angle of the planar mirror is adjustable only in one direction by employing a straight line, which connects contact points between the plurality of first support protrusions and the planar mirror to each other, as a swing axis.

6 Claims, 7 Drawing Sheets

OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2014-088040 filed on Apr. 22, 2014, the entire contents of which are incorporated herein by reference.

BACKGROUND

The technology of the present disclosure relates to an optical scanning device that forms a latent image on a surface to be scanned by exposure scanning, and an image forming apparatus including the same such as a copy machine, a printer, a facsimile, and a multifunctional peripheral thereof.

Conventionally, in an optical scanning device used in an image forming apparatus, beam light emitted from a light source is deflected in a deflector such as a polygon mirror, is led to a photosensitive drum (an image carrying member) by passing through an optical member such as a lens, exposes and scans a surface of the photosensitive drum, and forms an electrostatic latent image thereon.

In such an optical scanning device, a sensor for detecting writing light is arranged in order to decide a writing position (a writing timing) of an image. A writing position is controlled such that after the writing light is incident into the detection sensor, an image is written after a predetermined time (several µseconds) passes. The writing light is reflected toward the detection sensor by a mirror. However, at this time, when an angle of the mirror in a sub-scanning direction is shifted, since the writing light is deviated in a vertical direction (the sub-scanning direction) of the detection sensor and is not detected, drawing is not started.

Conventionally, in order to correct a position of the writing light in the sub-scanning direction, a correcting lens is mounted. However, since the correcting lens is expensive as compared with general resin parts, it is preferable to employ a configuration with no correcting lens in order to enhance a cost-down effect by reducing parts. Therefore, particularly, when an optical path length from the mirror to the detection sensor is long, since the accuracy of a mirror angle has a large influence on shift of the writing light in the sub-scanning direction, there is a case in which a means for adjusting the mirror angle is necessary.

In this regard, there has been known various technologies for adjusting the mirror angle with a simple configuration. For example, there has been proposed a configuration for adjusting the mirror angle by allowing one end of the mirror to be brought into press-contact with a support point of a housing side by an elastic member and to directly press the other end of the mirror by an adjusting screw.

Furthermore, for example, there has been proposed a configuration for adjusting the mirror angle by mounting the mirror in a wedge-shaped mirror holding member and rotating the mirror holding member.

SUMMARY

An optical scanning device according to one aspect of the present disclosure includes a light source unit, a polygon mirror, a planar mirror, and a mirror adjusting mechanism. The light source unit emits beam light. The polygon mirror deflects and scans the beam light from the light source unit with respect to a surface to be scanned. The planar mirror changes an optical path of beam light reflected by the polygon mirror. The mirror adjusting mechanism adjusts an angle of the planar mirror. The mirror adjusting mechanism includes an abutting surface and a mirror holding member, and the mirror holding member includes a mirror pressing part and a mirror receiving part. The abutting surface is provided with one or more first support protrusions making point contact or line contact with a reflecting surface of the planar mirror on the same straight line. The mirror pressing part of the mirror holding member presses a first end side portion of the planar mirror to the first support protrusions. The mirror receiving part of the mirror holding member is provided with one second support protrusion facing a second end side portion of the reflecting surface of the planar mirror and making point contact with the reflecting surface of the planar mirror. The abutting surface is parallel to a straight line, which connects contact points between the plurality of first support protrusions and the planar mirror to each other, and is not parallel to a plane including contact points between the planar mirror and the plurality of first support protrusions/the second support protrusion. The mirror holding member is rotated while maintaining a contact state between the planar mirror and the first support protrusions and a contact state between the mirror receiving part and the abutting surface, so that an angle of the planar mirror is adjustable only in one direction by employing the straight line, which connects the contact points between the plurality of first support protrusions and the planar mirror to each other, as a swing axis.

DETAILED DESCRIPTION

Figure 1:
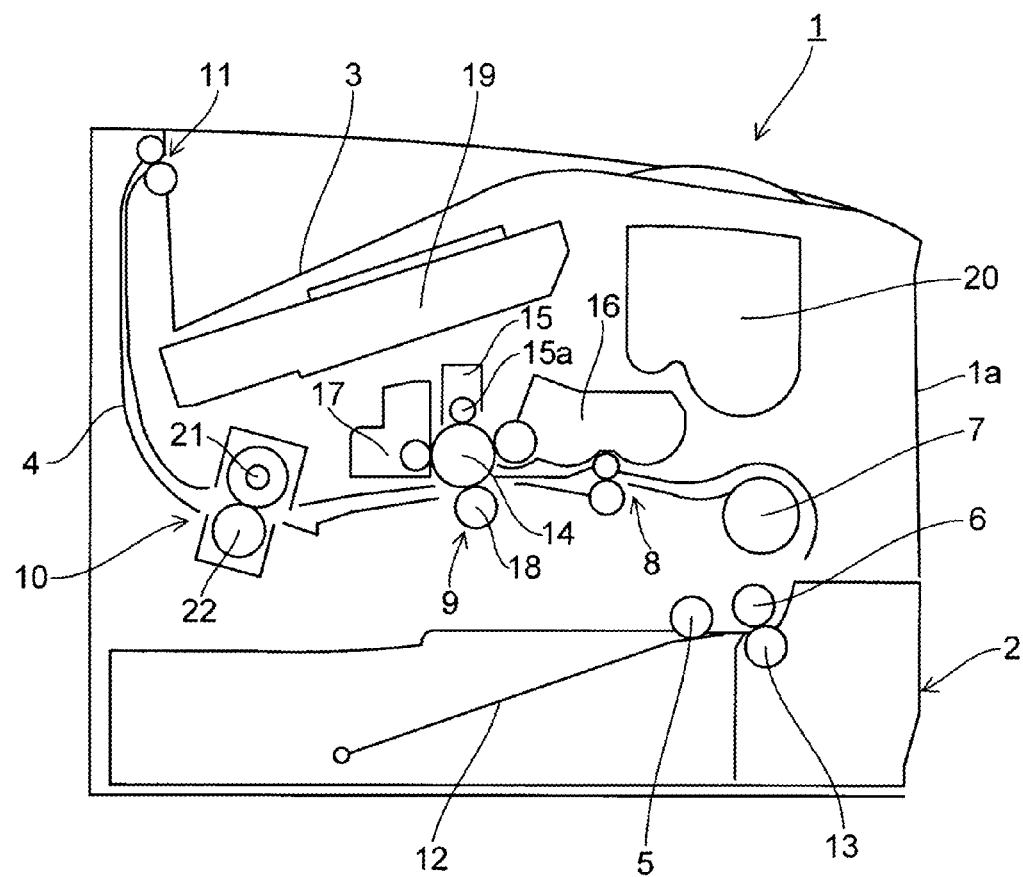
FIG. 1 is a sectional view illustrating a schematic configuration of an image forming apparatus mounted with an optical scanning device according to the present embodiment.

Hereinafter, the present embodiment will now be described with reference to the drawings. FIG. 1 is a schematic configuration diagram illustrating an entire configuration of an image forming apparatus 1 according to the present embodiment, and illustrates the right side as a front side of the image forming apparatus 1. At a lower portion of an apparatus body 1a of the image forming apparatus 1 (here, a monochrome printer), a paper feeding cassette 2 for accommodating loaded papers is disposed. Above the paper feeding cassette 2, a paper conveyance path 4 is formed to extend substantially horizontally from the front side to the rear side of the apparatus body 1a, to further extent upward, and to reach a paper discharge unit 3 formed on the upper surface of the apparatus body 1a. Sequentially from an upstream side along the paper conveyance path 4, a pick-up roller 5, a feed roller 6, an intermediate conveying roller 7, a resist roller pair 8, an image forming unit 9, a fixing unit 10, and a discharge roller pair 11 are disposed.

The paper feeding cassette 2 is provided with a paper loading plate 12 rotatably supported to the paper feeding cassette 2. When papers loaded on the paper loading plate 12 have been sent toward the paper conveyance path 4 by the pick-up roller 5 and a plurality of papers have been simultaneously sent by the pick-up roller 5, it is configured that the papers are loosened by the feed roller 6 and a retard roller 13 and only the uppermost one paper is conveyed. The papers sent to the paper conveyance path 4 are conveyed to the resist roller pair 8 by the intermediate conveying roller 7 by changing the conveyance direction to the rear side of the apparatus body 1a, and are supplied to the image forming unit 9 by the resist roller pair 8 with its timing adjusted.

The image forming unit 9 forms a predetermined toner image on a paper by an electrophotographic process, and includes a photosensitive drum 14 serving as an image carrying member pivotally supported to be rotatable clockwise in FIG. 1, and a charging device 15, a developing device 16, a cleaning device 17, a transfer roller 18, and an optical scanning device 19 disposed in the vicinity of the photosensitive drum 14, wherein the transfer roller 18 is disposed so as to face the photosensitive drum 14 while interposing the paper conveyance path 4 therebetween, and the optical scanning device 19 is disposed above the photosensitive drum 14. Above the developing device 16, a toner container 20 for refilling toner to the developing device 16 is disposed.

The charging device 15 includes a conductive rubber roller 15a connected to a power supply (not illustrated), wherein the conductive rubber roller 15a is disposed so as to abut the photosensitive drum 14. When the photosensitive drum 14 rotates, the conductive rubber roller 15a contacts with the surface of the photosensitive drum 14 and is driven to rotate. At this time, a predetermined voltage is applied to the conductive rubber roller 15a, so that the surface of the photosensitive drum 14 is uniformly charged.

Next, an electrostatic latent image based on input image data is formed on the photosensitive drum 14 by beam light emitted from the optical scanning device 19, and toner is attached to the electrostatic latent image by the developing device 16, so that a toner image is formed on the surface of the photosensitive drum 14. Then, a paper is supplied from the resist roller pair 8 to a nip portion (a transfer position) between the photosensitive drum 14 and the transfer roller 18 at a predetermined timing, so that the toner image of the surface of the photosensitive drum 14 is transferred onto the paper by the transfer roller 18.

The paper with the transferred toner image is separated from the photosensitive drum 14 and is conveyed toward the fixing unit 10. The fixing unit 10 is disposed at a downstream side of the image forming unit 9 with respect to the paper conveyance direction, and the paper with the transferred toner image in the image forming unit 9 is heated and pressed by a heating roller 21 and a pressing roller 22 brought into press-contact with the heating roller 21, which are provided in the fixing unit 10, so that the toner image transferred onto the paper is fixed.

The image-formed paper is discharged to the paper discharge unit 3 by the discharge roller pair 11. On the other hand, toner remaining on the surface of the photosensitive drum 14 is removed by the cleaning device 17. The photosensitive drum 14 is charged again by the charging device 15, and image formation is performed in the same manner.

Figure 2:
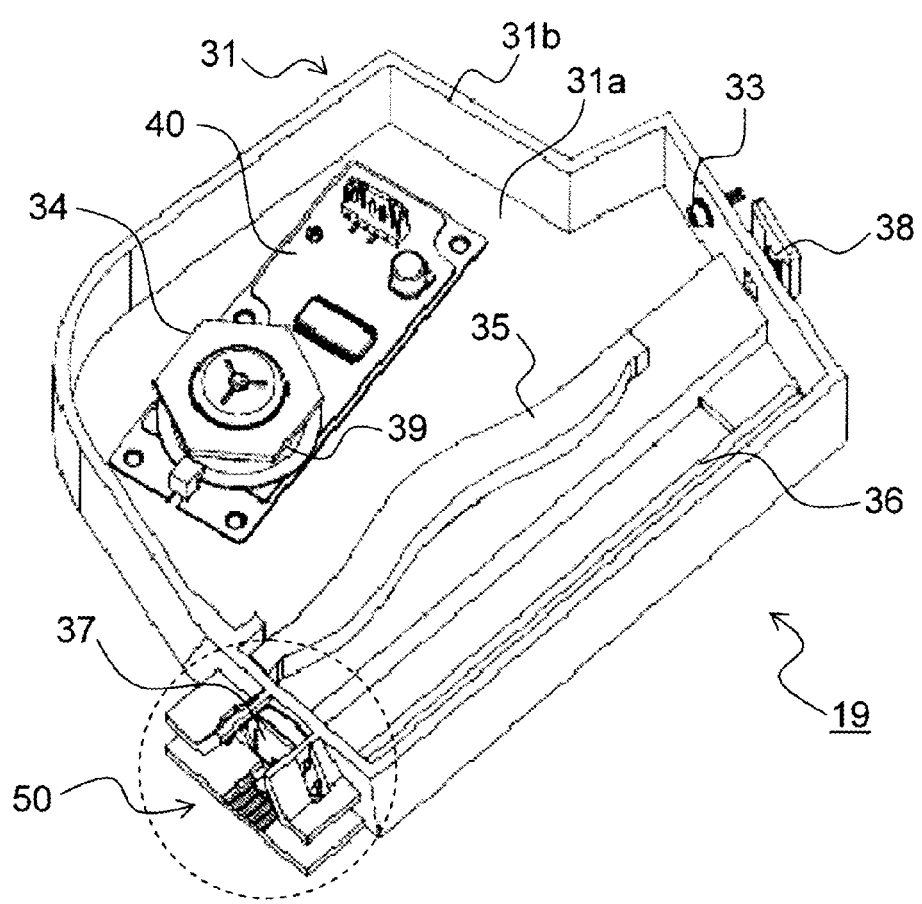
FIG. 2 is a perspective view illustrating an internal structure of an optical scanning device mounted in an image forming apparatus.

FIG. 2 is a perspective view of the optical scanning device 19 mounted in the image forming apparatus 1. In addition, FIG. 2 illustrates the state in which an upper lid of a housing has been removed in order to illustrate the inner structure of the optical scanning device 19.

The optical scanning device 19 includes a light source unit 33, a polygon mirror 34 serving as a rotating polygon mirror, a polygon motor 39 for rotationally driving the polygon mirror 34, a scanning optical system 35, a folding mirror 36, a detection mirror 37, and a detection sensor 38. The light source unit 33, the polygon mirror 34, the polygon motor 39, the scanning optical system 35, and the folding mirror 36 are disposed in a housing 31.

The light source unit 33 has a light source such as a laser diode for outputting laser light, and a cylindrical lens, a collimate lens and the like for shaping a beam diameter of the laser light, and outputs beam light modulated on the basis of image data input from a personal computer and the like (not illustrated).

The polygon mirror 34 is rotated by the polygon motor 39 at a predetermined speed, and deflects the beam light output from the light source unit 33 by using a reflective mirror surface provided at a side thereof. The polygon motor 39 is driven and controlled by a driver circuit provided in a circuit board 40.

The scanning optical system 35 includes a plurality of lenses, and converts the beam light reflected by the polygon mirror 34 so as to be scanned at a constant speed, and forms an image of the beam light on a surface to be scanned. The folding mirror 36 reflects the beam light having passed through the scanning optical system 35 toward the lower side of the scanning optical system 35, and leads the beam light to the photosensitive drum 14 (see FIG. 1).

The detection sensor 38 outputs a signal for controlling an exposure range (a writing timing) of a main scanning direction, and receives the beam light (writing light) having passed through the scanning optical system 35 via the detection mirror 37 disposed out of the exposure range.

In the aforementioned configuration, the light source unit 33 outputs the beam light modulated on the basis of image data toward the polygon mirror 34. The polygon mirror 34 reflects the beam light from the light source unit 33, and deflects and scans the reflected light by the rotation thereof. The scanning optical system 35 converts the beam light reflected by the polygon mirror 34 into constant speed scanning light, and forms an image of the constant speed scanning light on the photosensitive drum 14 (see FIG. 1) serving as a surface to be scanned via the folding mirror 36. In this way, the optical scanning device 19 exposes and scans a predetermined range on the uniformly charged photosensitive drum 14 in the scanning direction, so that an electrostatic latent image in which charging has been attenuated is formed on the photosensitive drum 14.

The housing 31 has a bottom surface portion 31a, a side wall portion 31b rising from a peripheral edge of the bottom surface portion 31a, and the upper lid (not illustrated) mounted on an upper edge of the side wall portion 31b, and is formed in a predetermined shape by using resin. In a space formed by the bottom surface portion 31a, the side wall portion 31b, and the upper lid, the light source unit 33, the polygon mirror 34, the polygon motor 39, the scanning optical system 35, and the folding mirror 36 are accommodated. In order to reflect the beam light toward the photosensitive drum (see FIG. 1) via an emission port (not illustrated)

formed in the bottom surface portion 31a, the folding mirror 36 is fixed to the bottom surface portion 31a obliquely with respect to the bottom surface portion 31a at a predetermined angle.

The detection mirror 37 and the detection sensor 38 are mounted at predetermined positions of the side wall portion 31b. A detailed mounting structure of the detection mirror 37 will be described later.

The polygon mirror 34 is mounted at a rotating shaft of the polygon motor 39, and the polygon motor 39 is fixed to the bottom surface portion 31a while interposing the circuit board 40 between the polygon motor 39 and the bottom surface portion 31a. The circuit board 40 is provided with a driver IC and the like for controlling the rotation driving of the polygon motor 39, and is fixed to the bottom surface portion 31a. In addition, the circuit board 40 may be disposed at other parts of the bottom surface portion 31a, or may be disposed at an upper portion of the housing 31 such as the upper lid.

Figure 3:
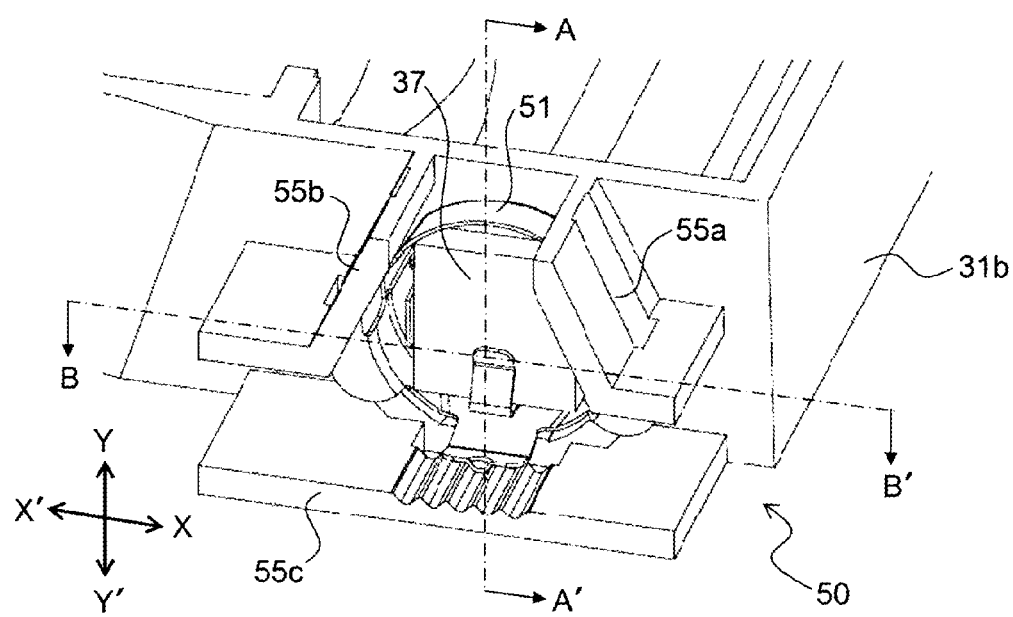
FIG. 3 is a perspective view illustrating the vicinity of a mirror adjusting mechanism for adjusting an angle of a detection mirror.
Figure 4:
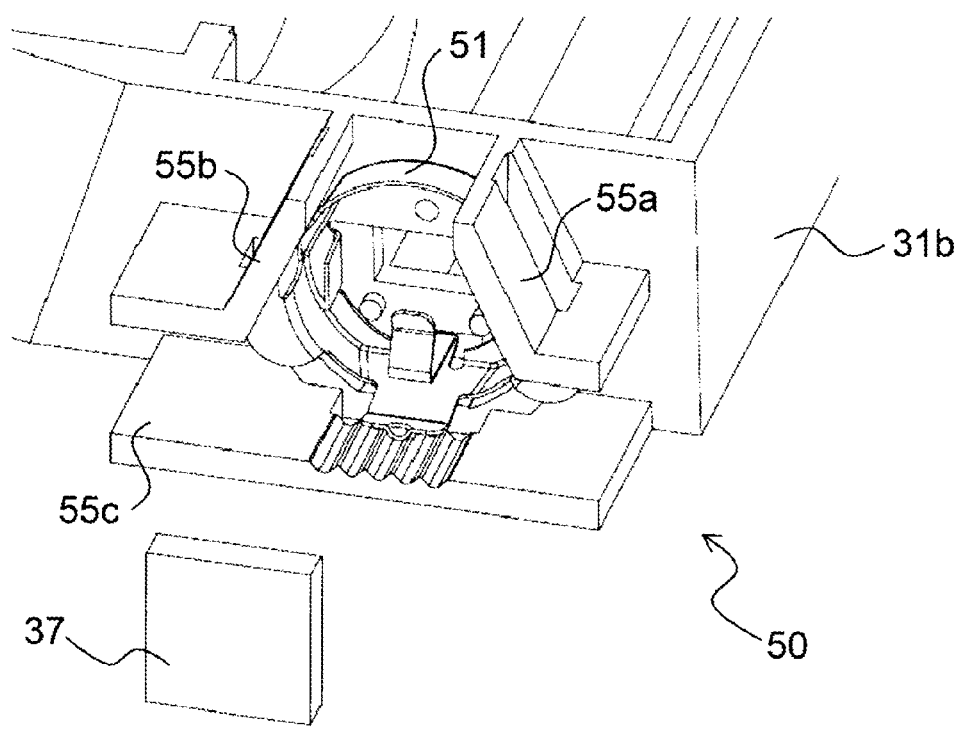
FIG. 4 is a perspective view illustrating a state in which a detection mirror has been removed from a mirror adjusting mechanism illustrated in FIG. 3.
Figure 5:
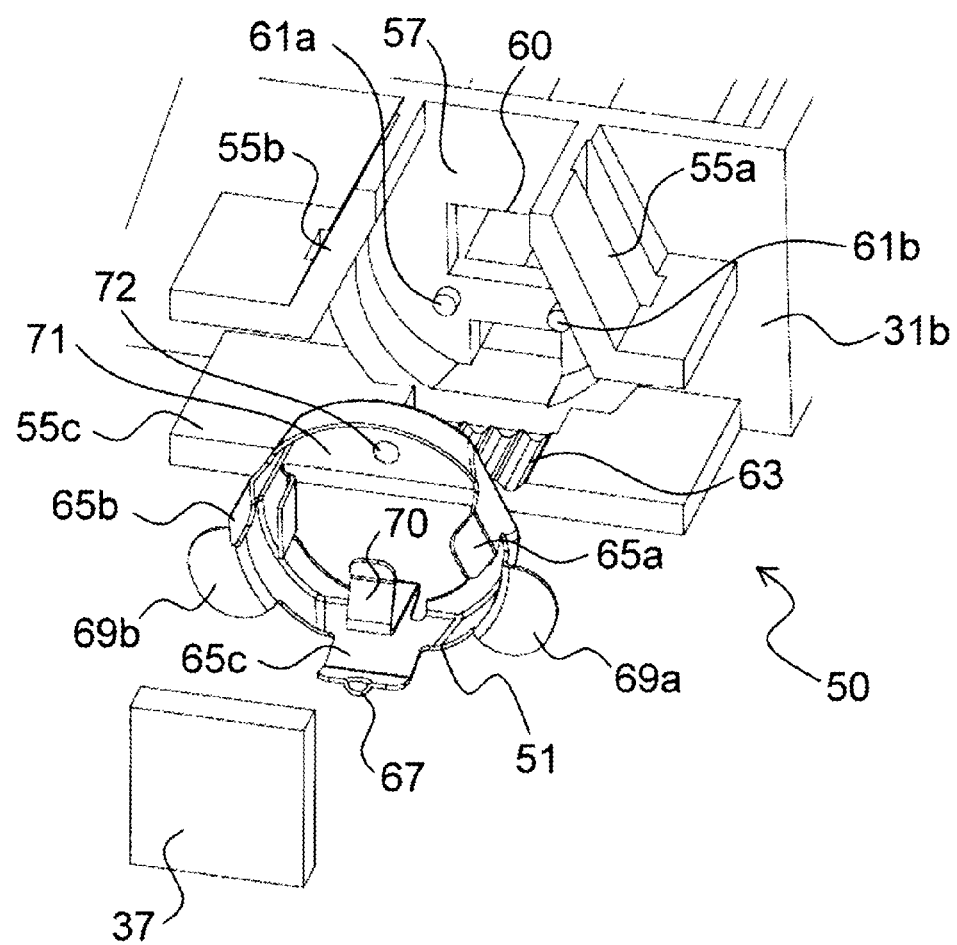
FIG. 5 is a perspective view illustrating a state in which a detection mirror and a mirror holding member have been removed from a mirror adjusting mechanism illustrated in FIG. 3.

FIG. 3 is a perspective view of the vicinity (within a broken line circle of FIG. 2) of a mirror adjusting mechanism 50 for adjusting an angle of the detection mirror 37, FIG. 4 is a perspective view illustrating a state in which the detection mirror 37 has been removed from the mirror adjusting mechanism 50 illustrated in FIG. 3, and FIG. 5 is a perspective view illustrating a state in which the detection mirror 37 and a mirror holding member 51 have been removed from the mirror adjusting mechanism 50 illustrated in FIG. 3. With reference to FIG. 3 to FIG. 5, a detailed configuration of the mirror adjusting mechanism 50 will be described. In addition, in FIG. 3, an arrow XX' direction indicates the main scanning direction and an arrow YY' direction indicates the sub-scanning direction.

The mirror adjusting mechanism 50 includes the detection mirror 37, the mirror holding member 51 for holding the detection mirror 37, and mirror holding member support portions 55a to 55c for rotatably supporting the mirror holding member 51.

The mirror holding member support portions 55a to 55c are integrally formed with one another so as to protrude outward from the side wall portion 31b of the housing 31. A part surrounded by the mirror holding member support portions 55a to 55c of the side wall portion 31b is an abutting surface 57 abutted by the mirror holding member 51, and an opening 60 is formed in a substantially central portion of the abutting surface 57. The beam light reflected by the polygon mirror 34 is incident into the detection mirror 37 via the opening 60, and the beam light reflected by the detection mirror is incident into the detection sensor 38 (see FIG. 2) via the opening 60. Furthermore, below the opening 60, first support protrusions 61a and 61b are formed to protrude outward from the abutting surface 57. The mirror holding member support portion 55c is formed on an inner side surface (an upper surface) thereof with a rack part 63 in which concave and convex portions are alternately continued.

The mirror holding member 51 is a substantially cylindrical member made of metal having a spring property (restorability), and has pressure-contact pieces 65a to 65c brought into press-contact from the inside with the mirror holding member support units 55a to 55c. The pressure-contact piece 65c brought into press-contact with the mirror holding member support unit 55c is provided with an engaging protrusion 67 engaged with the rack part 63 of the mirror holding member support unit 55c. Furthermore, pressing parts 69a and 69b are formed between the pressure-contact pieces 65a and 65c and between the pressure-contact pieces 65b and 65c, respectively.

A mirror pressing part 70 is formed closely above the pressure-contact piece 65c. The mirror pressing part 70 presses the lower portion of a rear surface (a front side surface of a paper surface of FIG. 4) of the detection mirror 37, thereby pressing the lower portion of a reflecting surface (a back side surface of the paper surface of FIG. 4) of the detection mirror 37 to the first support protrusions 61a and 61b of the abutting surface 57. Furthermore, between the pressure-contact pieces 65a and 65b, a mirror receiving part is formed to hold the upper portion of the reflecting surface of the detection mirror 37. In an inner surface side of the mirror receiving part 71, a second support protrusion 72 having a hemispherical shape is arranged. The lower portion of the detection mirror 37 corresponds to a first end side portion of the planar mirror and the upper portion of the detection mirror 37 corresponds to a second end side portion of the planar mirror.

When the detection mirror 37 is mounted in the housing 31, the upper portion of the reflecting surface of the detection mirror 37 is allowed to abut the mirror receiving part 71 of the mirror holding member 51, and the lower portion of the rear surface of the detection mirror 37 is allowed to abut the mirror pressing part 70 of the mirror holding member 51, so that the detection mirror 37 is set in the mirror holding member 51.

Then, in the state in which the pressure-contact pieces 65a to 65c are respectively allowed to face the mirror holding member support units 55a to 55c, the mirror holding member 51 is inserted into the part surrounded by the mirror holding member support portions 55a to 55c while the pressing parts 69a and 69b are being pressed by fingers. The mirror holding member 51 is inserted until the mirror holding member 51 abuts the abutting surface 57 and the lower portion of the reflecting surface of the detection mirror 37 abuts the first support protrusions 61a and 61b, so that the mounting of the detection mirror 37 to the housing 31 is completed.

When the detection mirror 37 is removed from the housing 31, in the state in which the pressure-contact pieces 65a and 65b are bent inward to release pressure-contact to the mirror holding member support units 55a and 55b, the mirror holding member 51 is drawn out from the mirror holding member support units 55a to 55c, so that it is possible to remove the mirror holding member 51 and the detection mirror 37 from the housing 31.

Figure 6:
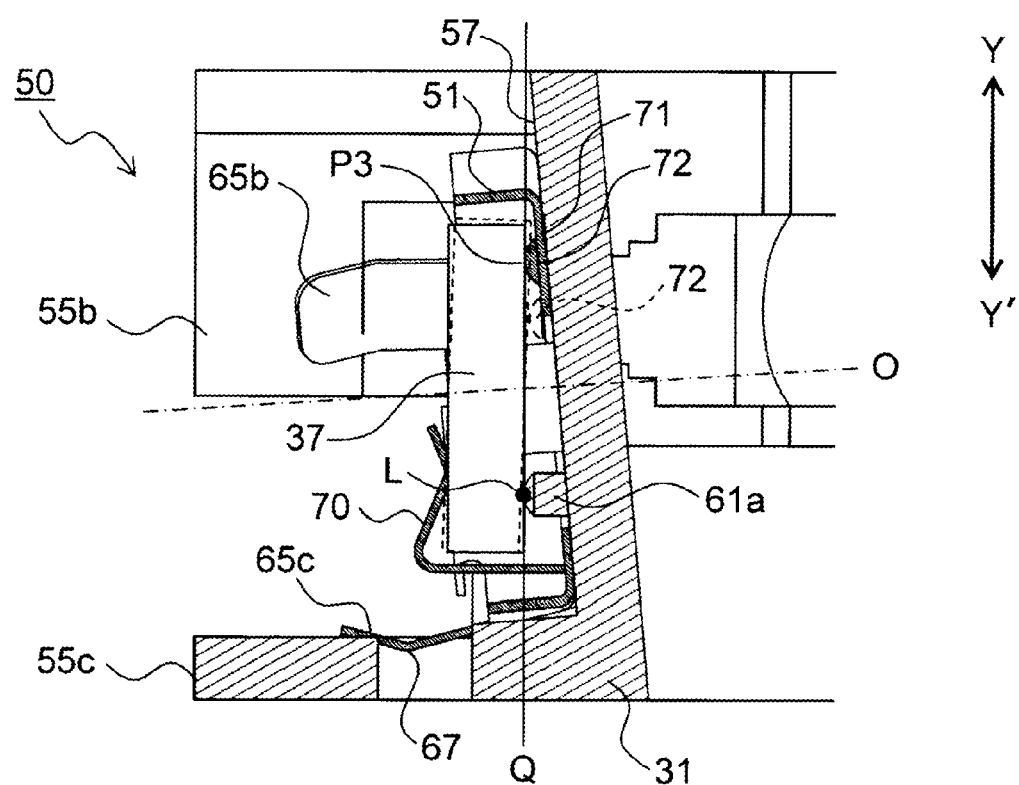
FIG. 6 is a side sectional view of a mirror adjusting mechanism taken along vertical line passing through a rotating axis of a mirror holding member.
Figure 7:
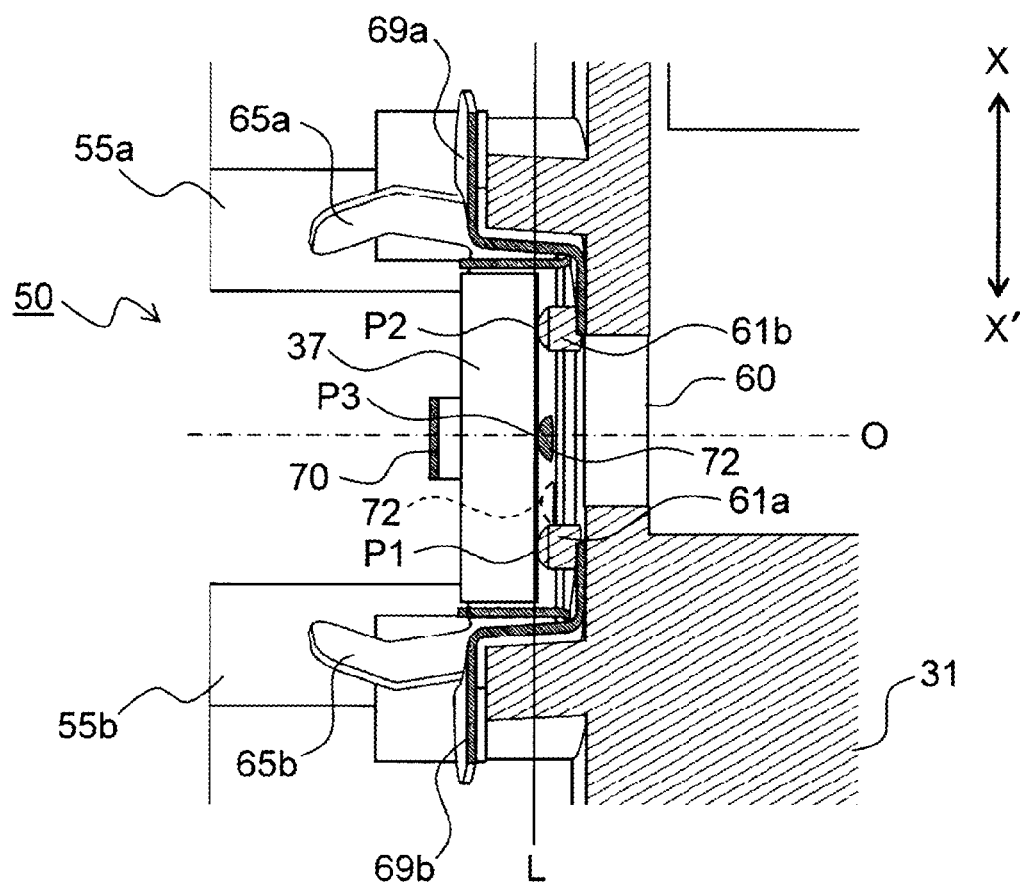
FIG. 7 is a plane sectional view of a mirror adjusting mechanism taken along horizontal line passing through the vicinity of first support protrusions.

FIG. 6 is a side sectional view (a sectional view taken along an arrow AA' of FIG. 3) of the mirror adjusting mechanism 50 taken along vertical line passing through a rotating axis 0 of the mirror holding member 51, and FIG. 7 is a plane sectional view (a sectional view taken along an arrow BB' of FIG. 3) of the mirror adjusting mechanism 50 taken along horizontal line passing through the vicinity of the first support protrusions 61a and 61b. A method for adjusting the angle of the detection mirror 37 will be described using FIG. 6 and FIG. 7 while referring to FIG. 2 to FIG. 4 according to necessity. In addition, similarly to FIG. 3, an arrow XX' direction indicates the main scanning direction and an arrow YY' direction indicates the sub-scanning direction.

As illustrated in FIG. 6 and FIG. 7, the detection mirror 37 is positioned with respect to the housing 31 at three points of the first support protrusions 61a and 61b formed on the abutting surface 57, and the second support protrusion 72 formed on the mirror receiving part 71 of the mirror holding member 51 contacting with the abutting surface 57. The abutting surface 57 is parallel to a straight line L (a straight line extending in the main scanning direction) connecting contact points P1 and P2 between the reflecting surface of the detection mirror 37 and the first support protrusions 61a and 61b. Furthermore, as illustrated in FIG. 6, the abutting surface 57 is inclined outward from the bottom to the top of the housing 31, and is not parallel to a plane Q including the contact points P1 and P2, and a contact point P3 between the reflecting surface of the detection mirror 37 and the second support protrusion 72. That is, the abutting surface 57 is an inclined surface inclined only in the sub-scanning direction while maintaining a parallel state with respect to the main scanning direction.

When the mirror holding member 51 is rotated counterclockwise while maintaining the contact state between the mirror receiving part 71 and the abutting surface 57 from the state of FIG. 3, the mirror receiving part 71 of the mirror holding member 51 is also rotated counterclockwise about the rotating axis 0 so as to move below the abutting surface 57. As a consequence, the second support protrusion 72 supporting the upper portion of the reflecting surface of the detection mirror 37 moves in an inner direction (broken line positions of FIG. 6 and FIG. 7) of the housing 31 along the inclination of the abutting surface 57.

On the other hand, since the first support protrusions 61a and 61b supporting the lower portion of the detection mirror 37 have been fixed to the abutting surface 57, the positions of the contact points P1 and P2 do not change by the rotation of the mirror holding member 51. Accordingly, the angle of the detection mirror 37 changes such that the detection mirror 37 falls down inside the housing 31 as indicated by a broken line of FIG. 6. That is, since the detection mirror 37 swings by employing the straight line L of the main scanning direction, which connects the contact points P1 and P2 to each other, as a swing axis, and the angle of the detection mirror 37 in the main scanning direction does not change, the angle only in the sub-scanning direction changes.

According to the mirror adjusting mechanism 50 of the present embodiment, it is possible to change the angle of the detection mirror 37 only in the sub-scanning direction without changing the angle of the detection mirror 37 in the main scanning direction. Consequently, optical path adjustment of beam light only in the sub-scanning direction is possible without changing the incident timing of the beam light to the detection sensor 38.

Furthermore, the mirror holding member 51 made of metal having a spring property is only configured to be fitted into the mirror holding member support units 55a to 55c formed on the outer side surface of the side wall portion 31b of the housing 31, so that it is possible to perform maintenance such as angle adjustment of the detection mirror 37 and exchange of the detection mirror 37 or the mirror holding member 51 without removing the upper lid of the housing 31.

Furthermore, with the rotation of the mirror holding member 51, the engaging protrusion 67 formed on the pressure-contact piece 65c moves in engagement with the rack part 63, so that a worker has catching feeling (click feeling) and can recognize that the mirror holding member 51 has rotated only by a predetermined angle. Moreover, it is possible to hold the mirror holding member 51 after the adjustment so as not to be easily moved.

Other technologies of the present disclosure are not limited to the aforementioned embodiment, and various types of modification can be made without departing from the scope of the present disclosure. For example, in the aforementioned embodiment, the two first support protrusions 61a and 61b are allowed to abut the reflecting surface of the detection mirror 37. However, three or more first support protrusions can also be provided such that abutting points with the detection mirror 37 are arranged in parallel to each other on the same straight line, or first support protrusions continued in a rib shape can also be provided. However, when the number of contact points between the first support protrusions and the detection mirror 37 increases (or they make line contact with each other), the dimension accuracy of the first support protrusions is required in order to highly accurately perform the positioning of the detection mirror 37. Accordingly, as described in the present embodiment, it is preferable to employ a configuration in which the detection mirror 37 is supported at two points of the first support protrusions 61a and 61b.

Furthermore, the aforementioned embodiment has a configuration in which the mirror holding member 51 is rotated along the abutting surface 57 inclined outward from the bottom to the top of the housing 31. However, an abutting surface 57 inclined inward from the bottom to the top of the housing 31 may also be used. It is sufficient if the inclination direction of the abutting surface 57 is decided in consideration of a die releasing direction when molding the housing 31.

Furthermore, in the aforementioned embodiment, the mirror adjusting mechanism 50 for adjusting the angle of the detection mirror 37 for leading beam light to the detection sensor 38 has been described. However, the technology of the present disclosure is not limited thereto, and the mirror adjusting mechanism 50 may also be used as an adjusting mechanism of other mirrors disposed between the polygon mirror 34 and a surface to be scanned (the photosensitive drum 4).

Furthermore, it is natural that the technology of the present disclosure can be applied to various image forming apparatuses provided with an optical scanning device, such as a monochrome copy machine, a digital multifunctional peripheral, a tandem or rotary type color printer or color copy machine, and facsimile, in addition to the monochrome printer as illustrated in FIG. 1.

The technology of the present disclosure can be used in an optical scanning device that forms an electrostatic latent image on a surface to be scanned by exposure scanning using a polygon motor, and an image forming apparatus including the same such as a copy machine, a printer, a facsimile, and a multifunctional peripheral thereof. When the technology of the present disclosure is used, it is possible to provide an optical scanning device capable of high accurately adjusting an angle only in one direction, in which the adjustment of a mirror angle is necessary, by using a simple configuration.

What is claimed is:

1. An optical scanning device comprising:
a light source unit that emits beam light;
a polygon mirror that deflects and scans the beam light from the light source unit with respect to a surface to be scanned;
a planar mirror that changes an optical path of beam light reflected by the polygon mirror; and
a mirror adjusting mechanism that adjusts an angle of the planar mirror,
wherein the mirror adjusting mechanism comprises:
an abutting surface provided with one or more first support protrusions making point contact or line contact with a reflecting surface of the planar mirror on the same straight line; and
a mirror holding member including a mirror pressing part that presses a first end side portion of the planar mirror to the first support protrusions, and a mirror receiving part provided with one second support protrusion facing a second end side portion of the reflecting surface of the planar mirror and making point contact with the reflecting surface of the planar mirror,
wherein the abutting surface is parallel to a straight line, which connects contact points between the plurality of first support protrusions and the planar mirror to each other, and is not parallel to a plane including contact points between the planar mirror and the plurality of first support protrusions/the second support protrusion, and the mirror holding member is rotated while maintaining a contact state between the planar mirror and the first support protrusions and a contact state between the mirror receiving part and the abutting surface, so that an angle of the planar mirror is adjustable only in one direction by employing the straight line, which connects the contact points between the plurality of first support protrusions and the planar mirror to each other, as a swing axis.

2. The optical scanning device of claim 1, wherein the abutting surface and a mirror holding member support unit for rotatably supporting the mirror holding member are formed at an outer side surface of a housing that accommodates the polygon mirror.

3. The optical scanning device of claim 2, wherein the mirror holding member has an elastically deformable pressure-contact piece, and the pressure-contact piece is brought into press-contact from the inside with the mirror holding member support unit formed to surround the abutting surface.

4. The optical scanning device of claim 3, wherein a rack part, in which concave and convex portions are alternately continued, is formed in any one of the pressure-contact piece and the mirror holding member support unit, and an engaging protrusion engaged with the rack part is formed in a remaining one.

5. The optical scanning device of claim 1, wherein the planar mirror is a detection mirror that leads beam light to a detection sensor that outputs a signal for controlling an exposure range of a main scanning direction, and the mirror adjusting mechanism can adjust an angle of the detection mirror only in a sub-scanning direction.

6. An image forming apparatus comprising the optical scanning device of claim 1, and an image carrying member having a surface to be scanned, which is canned by the beam light from the optical scanning device.

* * * * *